United States Patent
Frett (12)

(10) Patent No.: US 7,367,765 B2
(45) Date of Patent: May 6, 2008

(54) LADING TIE SNUGGER SYSTEM FOR SECURING CARGO

(75) Inventor: John W. Frett, Crete, IL (US)

(73) Assignee: Holland, L.P., Crete, IL (US)

( * ) Notice: Subject to any disclaimer, the term of this patent is extended or adjusted under 35 U.S.C. 154(b) by 294 days.

(21) Appl. No.: 11/241,665

(22) Filed: Sep. 30, 2005

(65) Prior Publication Data

US 2006/0078398 A1    Apr. 13, 2006

Related U.S. Application Data

(60) Provisional application No. 60/625,272, filed on Nov. 5, 2004, provisional application No. 60/614,917, filed on Sep. 30, 2004.

(51) Int. Cl.
  *B60P 7/08* (2006.01)

(52) U.S. Cl. ........................ 410/118; 410/97; 410/100; 410/113

(58) Field of Classification Search ............... 410/96, 410/97, 100, 117, 118, 129, 112, 113, 106, 410/114; 105/355; 248/499
See application file for complete search history.

(56) References Cited

U.S. PATENT DOCUMENTS

| 6,402,446 B1 * | 6/2002 | Nadherny et al. | 410/100 |
| 6,422,794 B1 * | 7/2002 | Zhan et al. | 410/100 |
| 6,935,819 B2 * | 8/2005 | Squyres | 410/104 |

* cited by examiner

*Primary Examiner*—Stephen Gordon
(74) *Attorney, Agent, or Firm*—Barnes & Thornburg LLP; David C. Brezina

(57) ABSTRACT

A lading tie snugger system for railway box cars which uses lading ties comprising of flexible straps that interface with various hardware items such as strap end pins, anchor fittings, bar buckles, strap tensioning devices and cargo nets. The lading tie strap and cargo net being held in place by the appropriate anchor provision connected to the anchor being contained in a pocket in the wall or floor of railway box or flat car. An applicants tensioning device inherent to the specific hardware arrangement of the lading tie snugger system being used is operated to remove any remaining slack in the lading ties and then apply the desired tension thereon to secure the lading to the railway car.

4 Claims, 14 Drawing Sheets

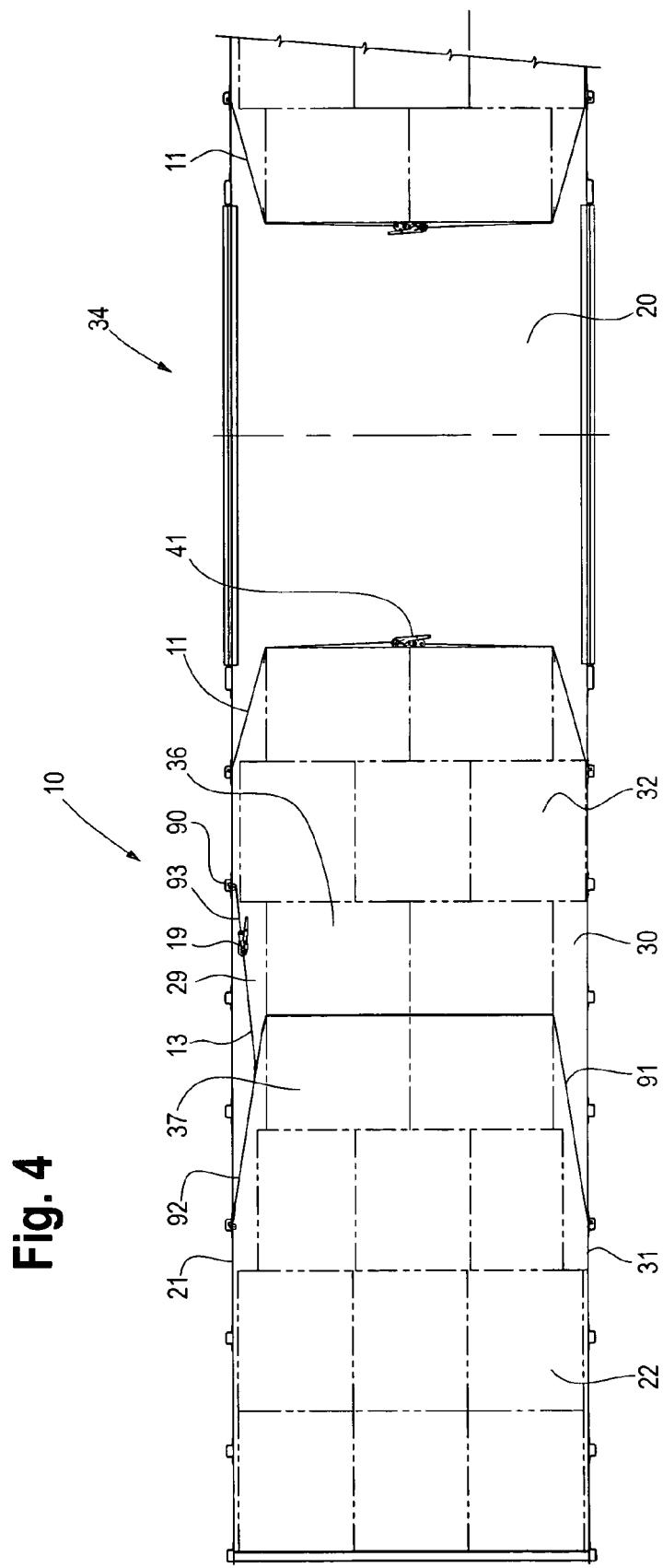

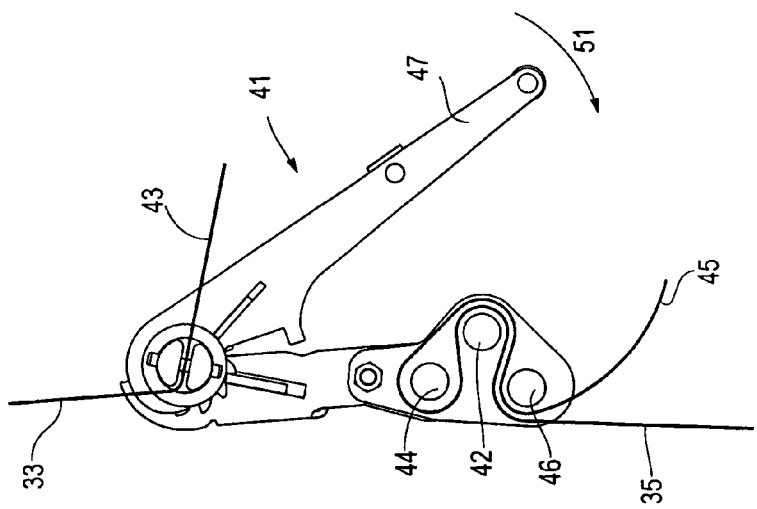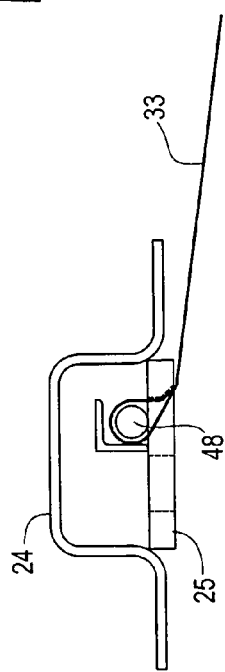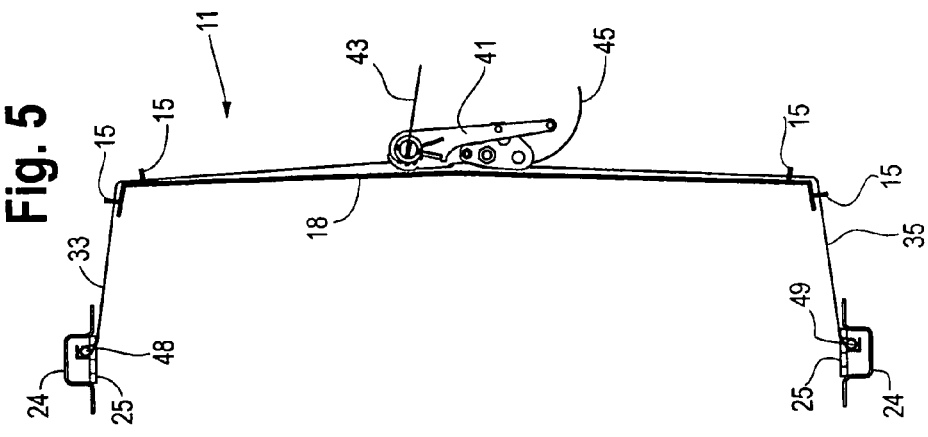

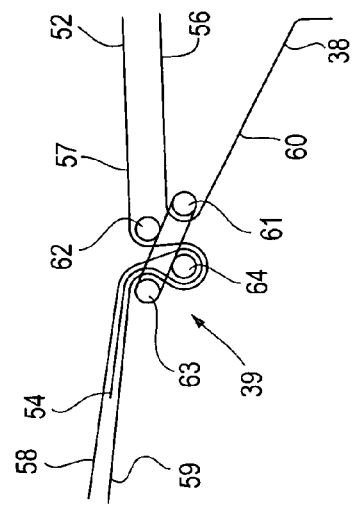
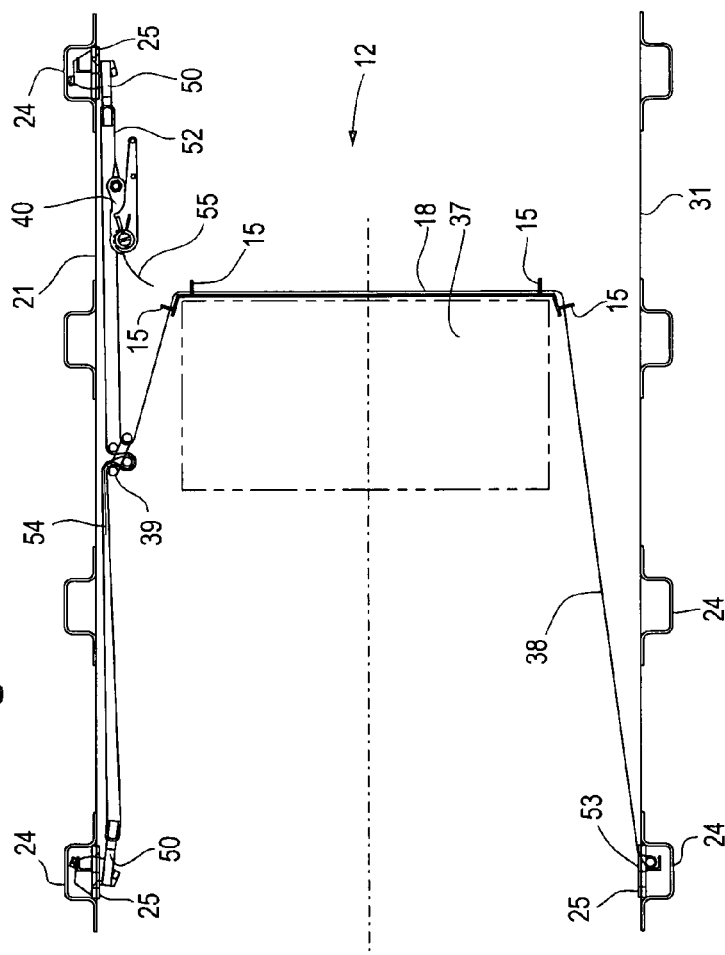

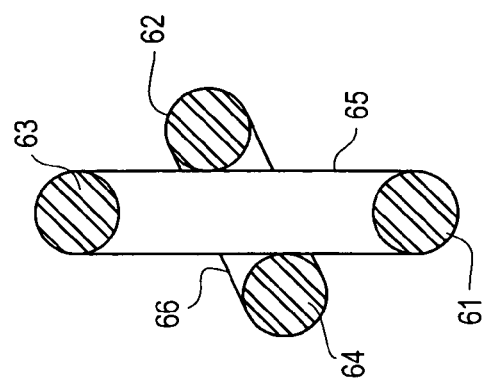
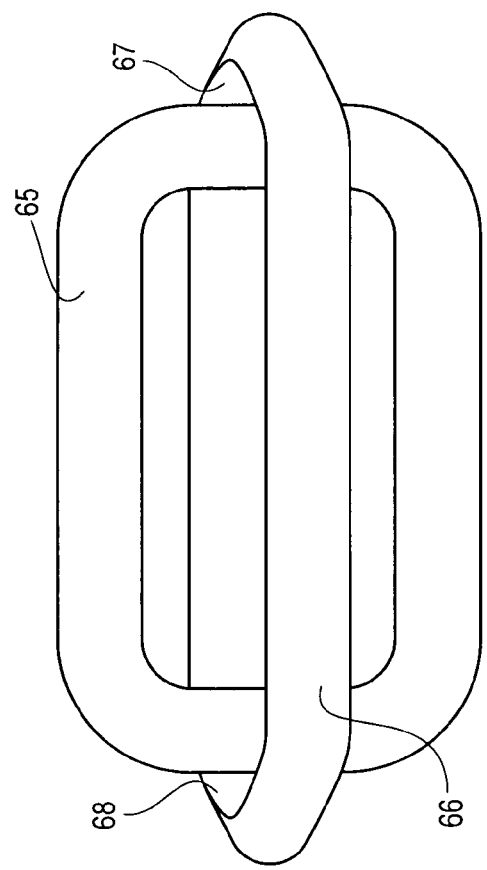
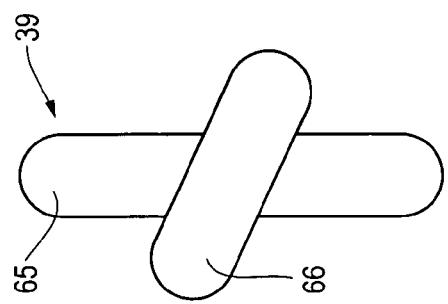

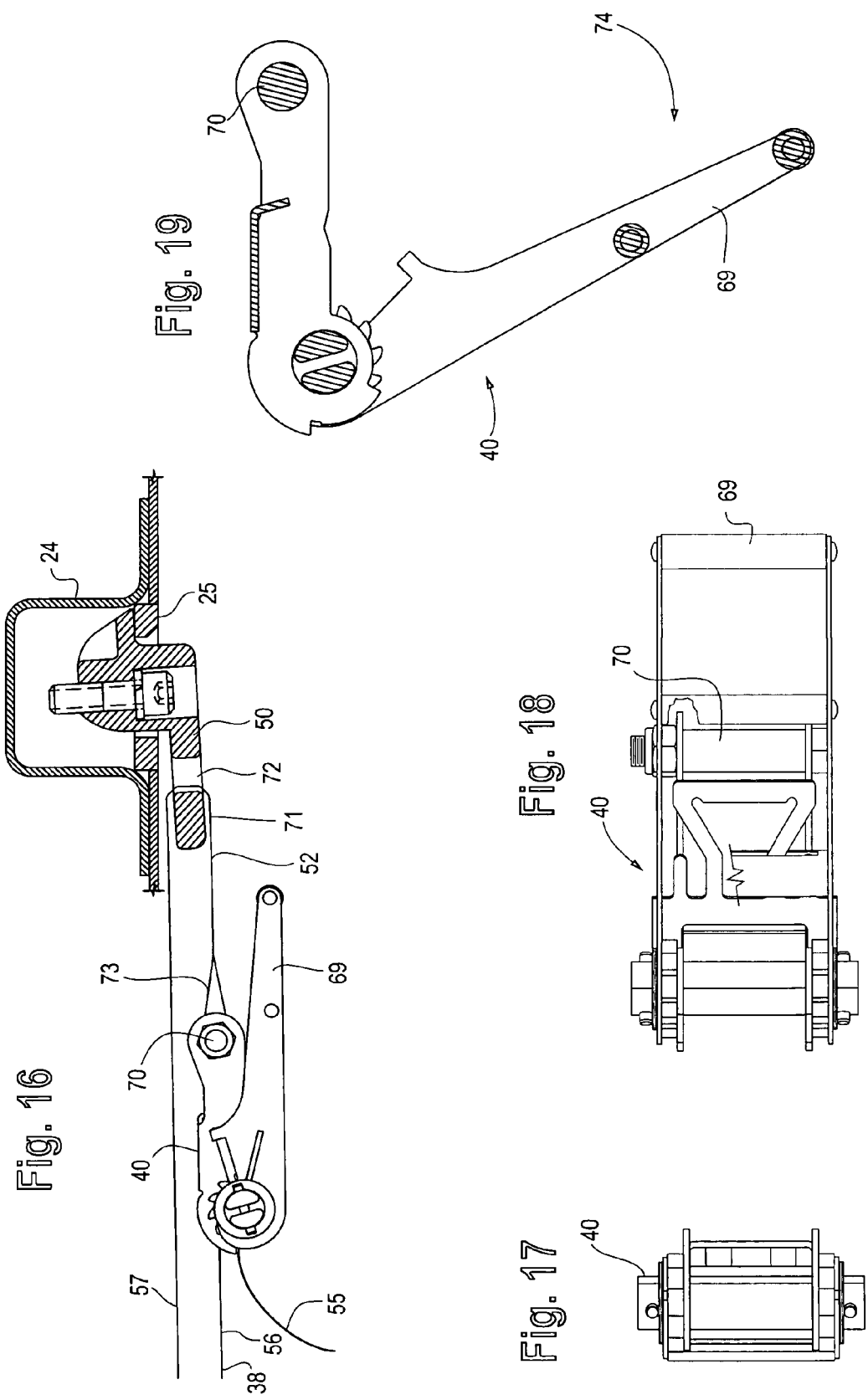

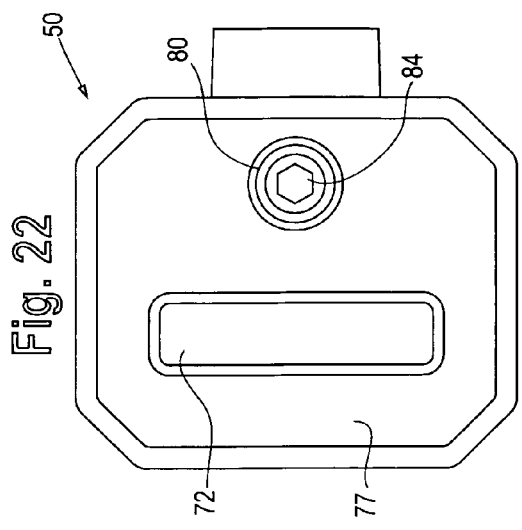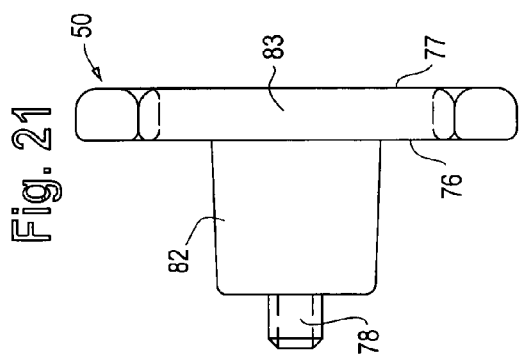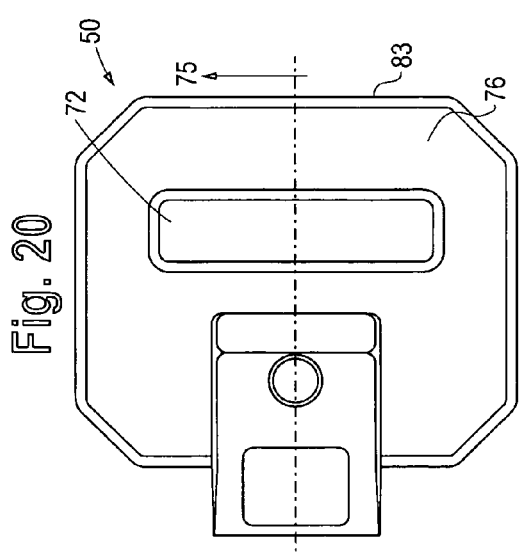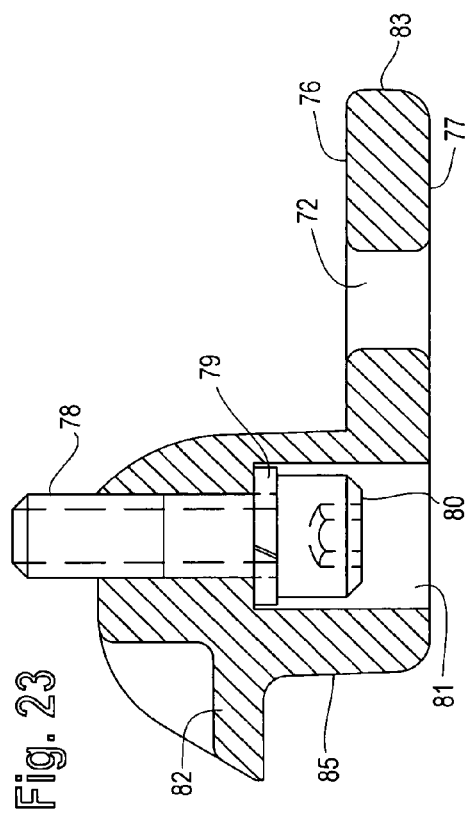

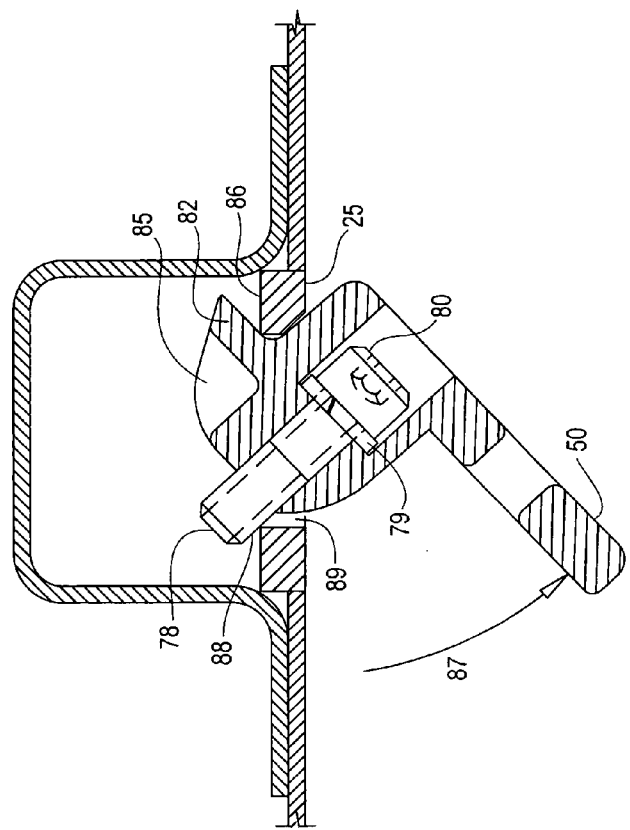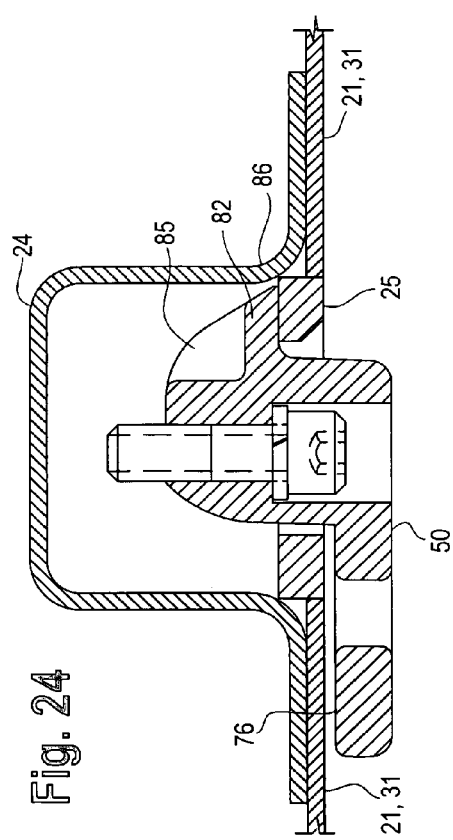

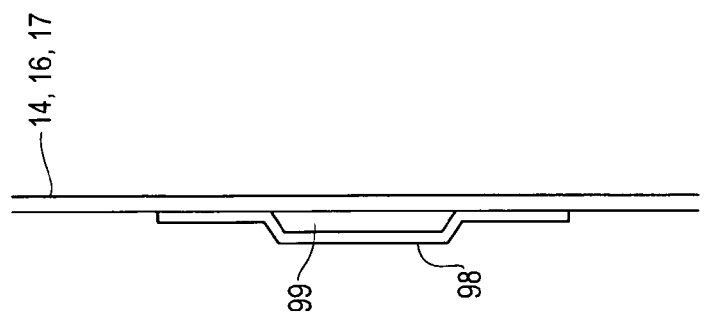
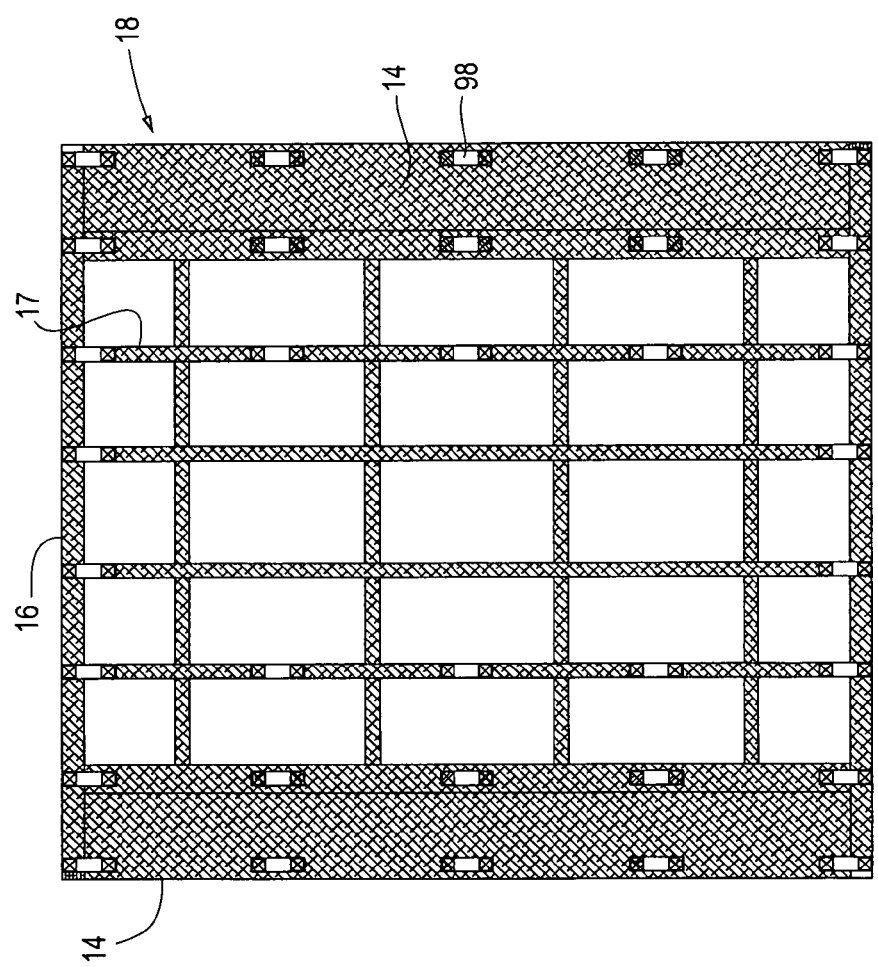

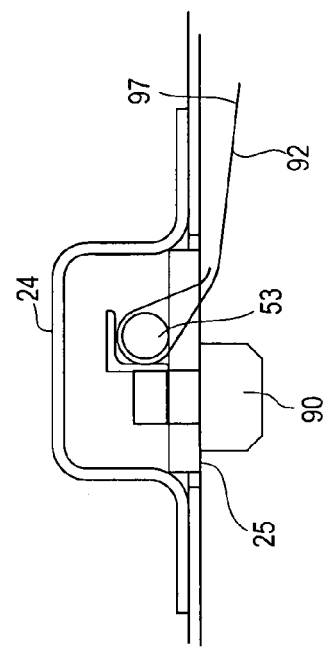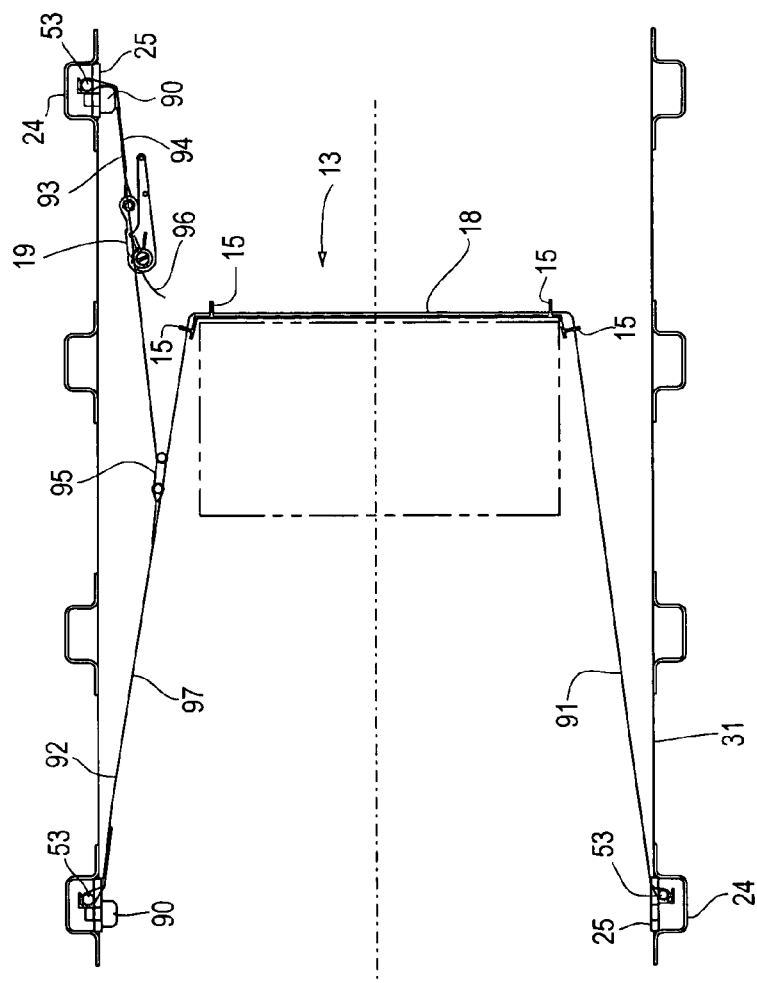

LADING TIE SNUGGER SYSTEM FOR SECURING CARGO

This application claims the priority of U.S. Provisional Application 60/614,917 filed Sep. 30, 2004 and Ser. No. 60/625,272 filed Nov. 5, 2004, both entitled Lading Tie Snugger System for Securing Cargo.

BACKGROUND OF THE INVENTION

Loads on railway cars need to be restrained from shifting under the various loads imposed by draft, buff, and rocking of the car. For particular types of loads, such as large rolls or coils of sheet material, or palletized loads, tensioning mechanisms using straps and anchors are advantageous.

The invention relates to an improved lading tie snugger system for railway cars. Prior art is specific to a particular type of strap, hook, pin or anchor fitting and is limited to its own inherent arrangement. The invention combines several distinct elements into an improved cargo lading tie snugger system so as to offer the user more versatility and ease in securing cargo with reusable hardware.

The hardware arrangement provides multiple provisions and is adapted to secure various different types of cargo. While specifically designed for rail cars, the invention could be adapted to other cargo transporters such as semi-trailers or intermodal shipping containers.

The invention provides a lading tie snugger system and method of using the same which use various lading tie straps, lading tie nets, fittings, buckles or strap end pins to form hardware to provide unique arrangements to secure various different types of cargo to railway cars.

The lading tie snugger system is mountable in fittings in a wall, deck or support of a vehicle so that the lading tie snugger system can be adapted to different load conditions including a different mix of lading.

DESCRIPTION OF RELATED ART

U.S. Pat. No. 6,422,794 teaches a cargo snugger strap and hook mechanism with an anchor with a "L" shaped aperture, where said system is dependant upon cargo straps and hook mechanism tailored to fit the specific "L" shaped aperture anchor. The disclosure in this patent is incorporated by reference in the instant application as if fully set forth herein.

U.S. Pat. No. 6,402,446 teaches a cargo lading tie anchor system using straps with a hook dependant upon a bar shaped anchor with strap slack take-up by way of a dual roller and ratchet tensioning device. The disclosure of the dual roller and ratchet tensioning device is referenced in the instant application as if fully set forth herein.

U.S. Provisional Patent application number 60/550,788 filed Mar. 5, 2004, shows two apertures, one for a pin and one for a plain woven strap. The unique capability of the multipurpose anchor allows enhanced usability for the railway car. The invention that is disclosed in this application is allowed to be tailored so as to fit the pin receiving aperture that is identified. This cited application shares a common assignee with the present application.

The prior art teaches certain parameters for lading tie anchor and lading tie strap systems and uses specific solutions to meet the needs. The instant invention departs from the limited functionality in its use of the lading tie strap arrangements being specific to a limited selection. Additionally, the prior art typically uses specific hardware that is dedicated for its specific use and is not versatile in its nature. The instant invention utilizes simple, yet offers unique hardware with provisions to allow multiple strap and net configurations and offers a real advantage for the user so the user may more easily secure cargo lading with reusable hardware.

BRIEF DESCRIPTION OF THE DRAWINGS

FIG. 4 is a sectional top horizontal view of an alternate lading tie snugger system having been applied and securing cargo lading in a railway box car.

FIG. 5 is a sectional top horizontal view of one particular hardware arrangement for applicants lading tie snugger system.

FIG. 6 is a top horizontal view of threadable tensioning device with its handle in a raised position and the strap ends routed through the threadable tensioning device.

FIG. 7 is a sectional top horizontal view of the strap end properly seated in the anchor and side wall stack post.

FIG. 11 is a sectional top horizontal view of one particular hardware arrangement for applicants lading tie snugger system.

FIG. 12 is a top horizontal view of the bar buckle with the routing of the straps illustrated.

FIG. 13 is an elevational side view of the bar buckle.

FIG. 14 is an elevational frontal view of the bar buckle.

FIG. 15 is a sectional elevational side view of the bar buckle.

FIG. 16 is a top horizontal view of lading strap and tensioning device assembly with its handle in a lowered position and the straps routed through the anchor fitting that is properly seated in the anchor and side wall stack post.

FIG. 17 is an elevational side view of the tensioning device that is part of the lading strap and tensioning device assembly.

FIG. 18 is an elevational frontal view of the tensioning device that is part of the lading strap and tensioning device assembly.

FIG. 19 is a top horizontal view of the tensioning device that is part of the lading strap and tensioning device assembly with its handle in a raised position.

FIG. 20 is an elevational back view of the anchor fitting.

FIG. 21 is an elevational side view of the anchor fitting.

FIG. 22 is an elevational frontal view of the anchor fitting.

FIG. 23 is a sectional top horizontal view taken on line 75 of FIG. 20.

FIG. 24 is a sectional top horizontal view of the anchor fitting that is properly seated in the anchor and side wall stake post and positioned up against the wall support.

FIG. 25 is a sectional top horizontal view of the anchor fitting that is properly seated in the anchor and side wall stake post with the anchor fitting swung away from the wall support.

FIG. 26 is an elevational frontal view showing an alternate example of the cargo net configuration that is disposed to receive the various lading straps and/or connecting hardware and illustrating the tailorability of the cargo net.

FIG. 27 is a partial sectional top horizontal view of the alternate cargo net loop detail.

FIG. 28 is a sectional top horizontal view of one particular hardware arrangement for applicants lading tie snugger system.

FIG. 29 is a sectional top horizontal view of the strap end properly seated in the anchor and side wall stake post and captivated by applicants capture plate.

DETAILED DESCRIPTION OF THE PREFERRED EMBODIMENT

Figure 1:
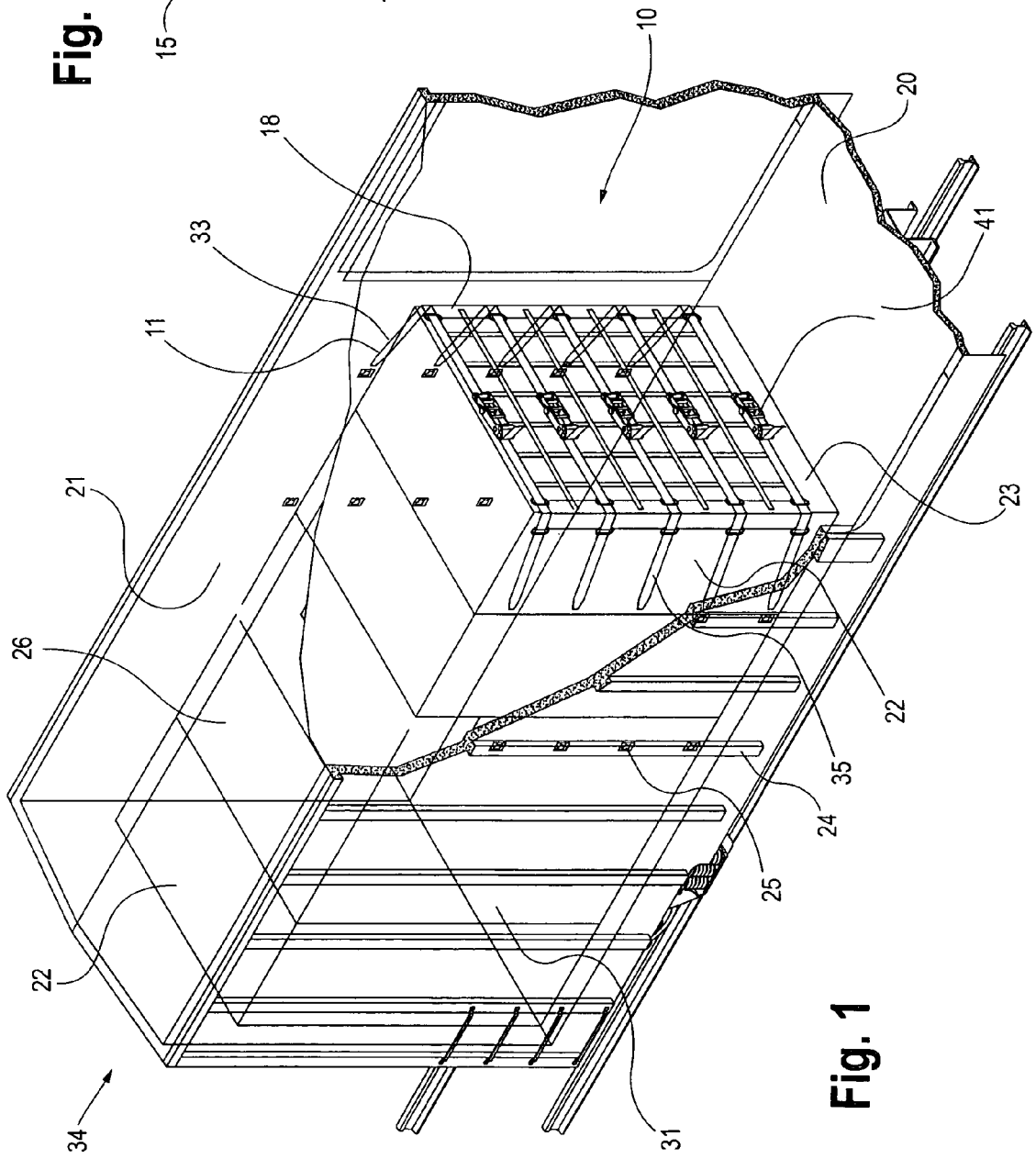
FIG. 1 is a largely schematic perspective view of support surfaces to which the lading tie snugger system has been applied, and several cargo pallet loads to be supported thereon, which support surface may be, for instance, the wall or deck of a railway box car.

FIG. 1 shows, in somewhat of a schematic perspective manner, a support 20 upon which a cargo pallet 23 with lading 22 is to be secured by Lading Tie Snugger System 10 by way of use of various components that, in this regard, is arranged in accordance with the principles of the present invention herein disclosed. The wall supports 21 and 31 upon which components are to be secured by the Lading Tie Snugger System 10 are arranged in accordance with the principles of the present invention. Support 20 may be a deck or floor of a railway flat car or other rail transport vehicle 34, or support 20 may be another type of vehicle to which the Lading Tie Snugger System 10 is applied in multiples for the usual application thereof to lading 22 with or without cargo pallets 23. The wall supports 21 and 31 may be a wall or bulkhead of a railway boxcar or other rail transport vehicle 34, or wall supports 21 and 31 may be of another type of vehicle to which the Lading Tie Snugger System 10 is applied in multiples for the usual application thereof to lading 22 with or without cargo pallets 23. These examples are illustrative, and not intended to limit the scope of the invention.

The present invention is applicable to securing various types of lading 22 to various supports 20, 21, 24 and 31. In the embodiment of the invention in FIG. 1, the cargo lading 22 is of a rectangular container 26 configuration that is involved in containing various types of commodities within. Illustrated are 5 rectangular containers 26 arranged upon various pallets 23, but containers 26 may be of any number or configuration as deemed desired by the user and industry practice. The cargo lading 22 need not be rectangular in form and may be of any size and shape deemed desired by the user and industry practice. Pallets 23 may be arranged as desired by the user which such as by stacking upon support 20. Pallets 23 are not necessary for securing lading 22 by Lading Tie Snugger System 10, but are show as an example. Lading 22 may be of the type specified by the standards of the Association of American Railroads. The interface between Lading Tie Snugger System 10 and support 20 and/or wall supports 21 and 31 is tailorable so as to assure proper securement of lading 22, modifications thereto will be apparent to those skilled in the art. In FIG. 1, Lading Tie Snugger System 10 is mountable to a side wall stake post 24 containing wall anchors 25 illustrating one example of said proper support. In accordance with the present invention, the Lading Tie Snugger System 10 is intended to be mounted to achieve securement of the respective lading 22 as hereinafter disclosed.

Lading Tie Snugger System 10 uses hardware arrangement 11 positioned as shown in FIG. 1, second hardware arrangement 12 or third hardware arrangement 13. System 10 can also use a combination of hardware arrangements 11, 12 and/or 13.

Lading Tie Snugger System 10 is shown in a particular location of support 20 and/or wall supports 21 and 31 in FIG. 1. The number and location of said Lading Tie Snugger System 10 are tailorable to provide the desired securement options desired by the user.

The Lading Tie Snugger System 10 is illustrated in FIGS. 2 through 37.

Figure 2:
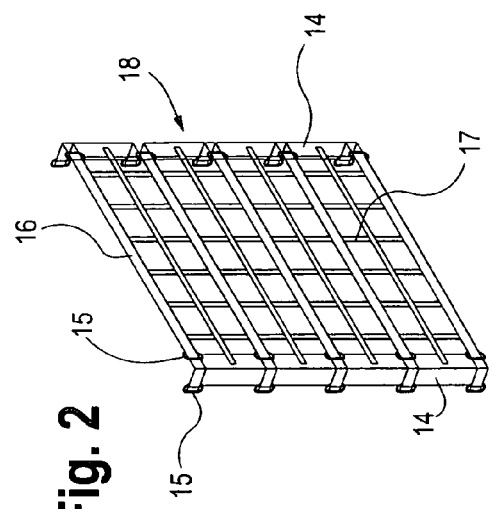
FIG. 2 is a diagrammatic perspective view showing a cargo net disposed to receive the various lading tie straps and/or connecting hardware.

The Lading Tie Snugger System 10 is comprised in part by cargo net 18. A perspective view is shown in FIG. 2. The preferred cargo net 18 is comprised of two vertical flexible wall sections 14, one vertical flexible wall section 14 at each lateral end of cargo net 18. The two vertical flexible wall sections 14 are attached to each other by multiple horizontal flexible wall sections 16. The multiple horizontal flexible wall sections 16 are attached by multiple vertical flexible wall sections 17. Various loops 15 are attached to cargo net 18 and one particular arrangement is illustrated in FIG. 2. FIG. 2 illustrates a total of twenty loops 15 where 10 of loops 15 are arranged along the each vertical flexible wall section 14. Loop 15 and cargo net 18 are tailorable to provide the desired attachment options desired by the user and thereto will be apparent to those skilled in the art. The size and shape may be varied as desired by the user and is not dependent upon the function of the invention. Cargo net 18 is typical of that used in the industry. The Lading Tie Snugger System 10 of the present invention utilizes cargo net 18 combined with other elements to secure loads in a transportation vehicle, such as a rail car.

Figure 3:
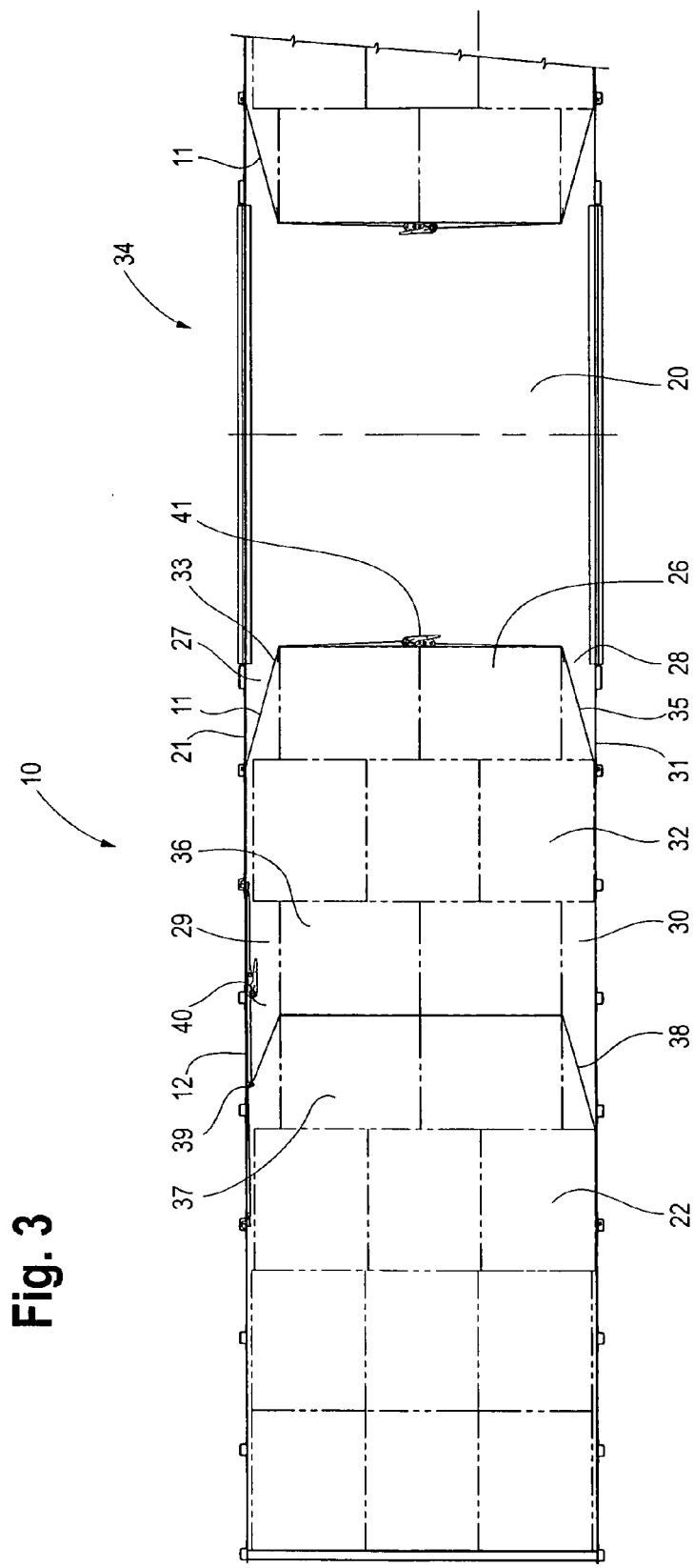
FIG. 3 is a sectional top horizontal view of the lading tie snugger system having been applied and securing cargo lading in a railway box car.

FIG. 3 is a sectional top horizontal view of vehicle 34 further illustrating the Lading Tie Snugger System 10. Lading Tie Snugger System 10 is shown with hardware arrangement 11 combined with hardware arrangement 12 on one half of vehicle 34 arranged in accordance with the principles of the present invention herein disclosed. Combining hardware arrangements 11 and 12 is desired when the weight of cargo lading 22 is large enough to require additional restraining beyond the practical capability by hardware arrangement 11 alone.

FIG. 3 also illustrates hardware arrangement 11 of Lading Tie Snugger System 10 where rectangular containers 26 do not reach laterally completely across support 20 leaving spaces 27 and 28 between said rectangular containers 26 and wall supports 21 and 31 respectively. Hardware arrangement 11 offers the benefit over hardware arrangement 12 by allowing spaces 27 and 28 to be reduced to where rectangular containers 26 may reach nearly across support 20 providing the use of larger rectangular containers 26 than is possible by hardware arrangement 12. The reduction of spaces 27 and 28 is defined by the size of lading straps 33 and 35. In practice lading strap assemblies 33 and 35 are relatively thin and therefore does not present a significant obstruction and therefore maximizes the amount of lading 22 in vehicle 34. An example of laterally maximized lading 22 is illustrated by rectangular containers 32 in FIG. 3.

Hardware arrangement 12 of Lading Tie Snugger System 10 is also illustrated in FIG. 3. Rectangular containers 36 and 37 do not reach laterally completely across support 20 leaving spaces 29 and 30 between said rectangular containers 36 and 37 and wall supports 21 and 31 respectively. Hardware arrangement 12 offers the benefit over hardware arrangement 11 by allowing rectangular containers 36 and 37 to be stowed up against each other with only a flexible cargo net 18 and lading strap assembly 38 between them. Other hardware items, bar buckle 39 and tensioning device 40 of hardware arrangement 12 that would interfere and cause damage to lading 22 is set off in either spaces 29 or 30. The placement of hardware items, bar buckle 39 and tensioning device 40 in either spaces 29 or 30 prevents rectangular containers 36 and 37 to be laterally maximized to the extent represented by rectangular containers 32. The spaces 29 and 30 is defined by the size of bar buckle 39 and tensioning device 40.

FIG. 4 is a sectional top horizontal view of vehicle 34 further illustrating the tailorability of Lading Tie Snugger System 10. Lading Tie Snugger System 10 is shown comprised by hardware arrangement 11 combined with hardware arrangement 13 on one half of vehicle 34 arranged in accordance with the principles of the present invention herein disclosed. Combining hardware arrangements 11 and 13 is desired when the weight of cargo lading 22 is large enough to require additional restraining beyond the practical capability by hardware arrangement 11 alone.

Hardware arrangement 13 of Lading Tie Snugger System 10 illustrated in FIG. 4 is adapted to the securing rectangular containers 36 and 37, which containers do not reach laterally completely across support 20 leaving spaces 29 and 30 between said rectangular containers 36 and 37 and wall supports 21 and 31 respectively. Hardware arrangement 13 offers the benefit over hardware arrangement 11 by allowing rectangular containers 36 and 37 to be stowed up against each other with only a flexible cargo net 18 and lading strap assembly 91 between them. Other hardware items, capture plate 90, lading strap and loop assembly 92 and lading strap and tensioning device 93 of hardware arrangement 13 that would interfere and cause damage to lading 22 is set off in either spaces 29 or 30. The placement of hardware items, capture plate 90, lading strap and loop assembly 92 and lading strap and tensioning device 93 in either spaces 29 or 30 prevents rectangular containers 36 and 37 to be laterally maximized to the extent represented by rectangular containers 32. The spaces 29 and 30 is defined by the size of lading strap and loop assembly 92 and lading strap and tensioning device 93 and their placement in vehicle 34.

FIG. 5 is a sectional top horizontal view of hardware arrangement 11 illustrating the Lading Tie Snugger System 10. Hardware arrangement 11 is comprised of numerous lading strap assemblies 33 and 35, threadable tensioning device 41 and a cargo net 18. FIGS. l and 2 illustrates the option of five lading strap assemblies 33 and 35, threadable tensioning device 41 and one cargo net 18. FIG. 5 is top view of one such arrangement of the strap pins 48 and 49 of lading strap assemblies 33 and 35 shown properly engaged in anchors 25 and this engagement process is described in U.S. Pat. No. 6,422,794. The opposite lading strap ends 43 and 45 of lading strap assemblies 33 and 35 respectively are shown threaded through loops 15 in cargo net 18 and routed across cargo net 18 to threadable tensioning device 41.

A top horizontal view of tensioning device 41 is shown with lading strap ends 43 and 45 of lading strap assemblies 33 and 35 respectively and properly routed and threaded through tensioning device 41 in FIG. 6. Tensioning device 41 includes three pins 42, 44 and 46 that function as an integral buckle. Prior art does not include an integral three pin buckle arrangement. The positions of integral pins 42, 44 and 46 in tensioning device 41 maintain the desired function, ease of routing and operational take-up of slack in both lading strap assemblies 33 and 35. The tensioning device in U.S. Pat. No. 6,422,794 allows routing and take-up of slack in only one strap. The tensioning device described in U.S. Pat. No. 6,402,446 allows routing and take-up of slack in both straps but includes an integral two roller type buckle instead of tensioning device 41 with the integral three pins 42, 44 and 46 arrangement. Pins 42, 44 and 46 tensioning device 41 offer the strap slack take-up, and load carrying capacity similar to the integral two roller type buckle but with easier slack take-up.

Once lading strap ends 43 and 45 of lading strap assemblies 33 and 35 respectively are properly routed and threaded through the tensioning device 41 as shown in FIG. 6 lading strap end 45 of lading strap assembly 35 is pulled taut so as to take-up most of the slack in lading strap assemblies 33 and 35. Thereafter, tensioning device handle 47 is first lifted and than swung clockwise as indicated by arrow 51 so as to operate with a ratcheting type action and take-up any remaining slack in lading strap assemblies 33 and 35. Tensioning device handle 47 is then stored in its lowest position as shown in FIGS. 8 and 9.

FIG. 7 is a sectional top horizontal view of the strap pin 48 of lading strap assembly 33 shown properly engaged in anchor 25 and side wall stake post 24. The use and engagement process is described in U.S. Pat. No. 6,422,794.

Figure 8:
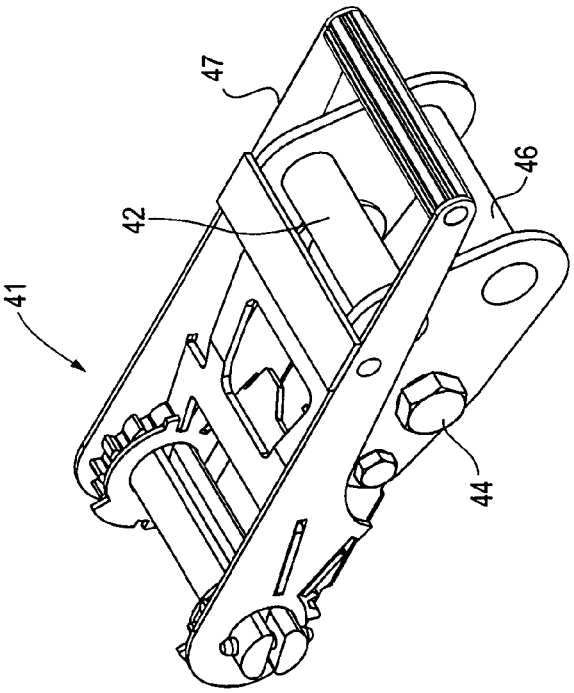
FIG. 8 is a diagrammatic perspective view showing the threadable tensioning device with its handle in its lowest position.

FIG. 8 is a largely diagrammatic perspective view of threadable tensioning device 41. Tensioning device handle 47 is shown stored in its lowest position along with its position relative to pins 42, 44 and 46.

Figure 9:
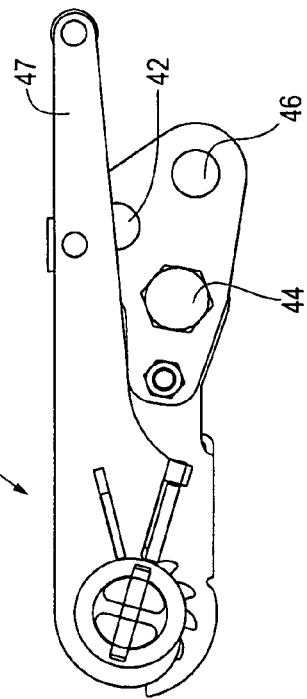
FIG. 9 is an elevational side view of threadable tensioning device with its handle in its lowest position.

FIG. 9 is an elevational side view of tensioning device 41. Handle 47 is shown stored in its lowest position along with its relative position in regards to pins 42, 44 and 46.

Figure 10:
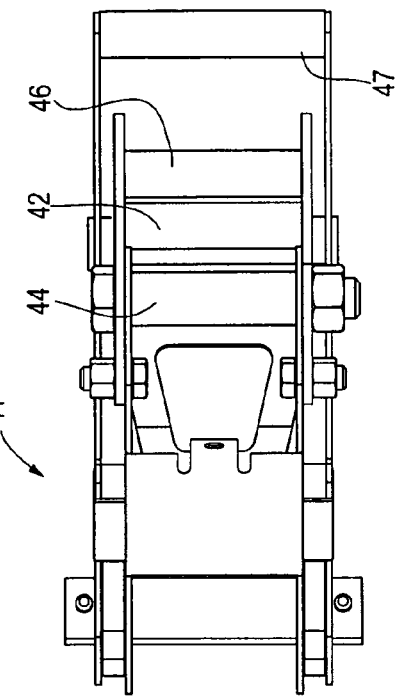
FIG. 10 is a bottom view of the threadable tensioning device.

FIG. 10 is a bottom view of tensioning device 41. The tensioning device handle 47 is shown stored in its lowest position along with its relative position in regards to the three integral pins 42, 44 and 46. Pin 44 is shown as a bolt that facilitates assembly of tensioning device 41 but is not limited to a bolt and the use of equivalents is contemplated.

FIG. 11 is a sectional top horizontal view of hardware arrangement 12 illustrating the Lading Tie Snugger System 10. Hardware arrangement 12 is comprised of numerous lading strap assemblies 38, lading strap and tensioning device assemblies 40, bar buckles 39 and anchor fittings 50 and a cargo net 18.

FIGS. 1 and 2 show the option of five lading strap assemblies 33 and 35, tensioning device 41 and cargo net 18 for hardware arrangement 11. Hardware arrangement 12 (not shown in FIG. 1) may consist of a similar vertical arrangement of the appropriate components that are shown in FIG. 11. FIG. 11 is a sectional top horizontal view of one such arrangement where the strap pin 53 of lading strap assembly 38 is shown properly engaged in anchor 25 and this engagement process is described in U.S. Pat. No. 6,422,794. The opposite lading strap and tensioning device assembly 52 is shown threaded through anchor fittings 50 and then through bar buckle 39.

In hardware arrangement 12, components may be installed in anchors 25 in wall supports 21 and 31 before lading 22 is stowed on support 20 in vehicle 34. The user does not need access to the anchors 25 after lading 22 is stowed for proper securement.

Before lading 22 is stowed on support 20 in vehicle 34, strap pin 53 of lading strap assembly 38 and anchor fittings 50 maybe first installed appropriately within the desired anchors 25. Lading strap end 54 of lading strap and tensioning device assembly 52 is routed through anchor fittings 50 and through bar buckle 39 as shown in FIGS. 11 and 12 and then hang on wall support 21 allowing appropriate clearance to allow loading and stowing of lading 22 on support 20 in vehicle 34. Bar buckle 39 is allowed to slide on the straps to a desired position adjacent to wall support 21. The desired position of bar buckle 39 is dependent upon the end of rectangular container 37 shown in FIG. 3. Personnel will desire to position bar buckle 39 so it is reachable after lading 22 is stowed so lading strap end 55 of lading strap assembly 38 may be routed following path 60 around bar 61 and then following path 56 as illustrated in the top horizontal view in FIG. 12. Personnel will also desire to position bar buckle 39 far enough back from the end of rectangular container 37 to provide an adequate strap angle for proper securement of lading 22. The lading strap end 55 of lading strap assembly 38 would be routed along wall support 31 allowing appropriate clearance to allow loading and stowing of lading 22 is stowed on support 20 in vehicle 34. After lading 22 is stowed as desired, cargo net 18 is placed across lading 22 appropriately and all lading strap ends 55 of lading strap assemblies 38 are routed through loops 15 of cargo net 18 as shown in FIG. 11. All lading strap ends 55 of lading strap assemblies 38 are then routed appropriately through tensioning devices 40 of lading strap and tensioning device assemblies 52 so then lading 22 is secured by taking up strap slack by use of tensioning devices 40.

FIG. 12 is a top horizontal view of bar buckle 39 with localized routing paths for lading strap assembly 38 and lading strap and tensioning device assembly 52. Lading strap end 54 of lading strap and tensioning device assembly 52 is routed through first one anchor fitting 50 and then through bar buckle 39 by what is defined by path 57 threading around bar 62, then bar 64, then bar 63 and then following path 59 towards the opposing anchor fitting 50. Lading strap end 54 of lading strap and tensioning device assembly 52 is then routed through the second anchor fitting 50 by way of path 59 and then back through bar buckle 39 by what is defined by path 58 threading around bar 63, then bar 64, then back across bar 63 in such a manner that lading strap end 54 is routed between strap paths 58 and 59. Also previously disclosed and shown in more detail in FIG. 12, lading strap end 55 of lading strap assembly 38 is first routed through loops 15 of cargo net 18 and then through bar buckle 39 by what is defined by path 60 threading around bar 61 and then following path 56 towards and then through tensioning device 40. Once components are arranged as shown in FIGS. 11 and 12, slack is removed in lading strap assembly 38 and lading strap and tensioning device assembly 52 by way of being pulled taut by use of tensioning device 40.

FIG. 13 is an elevational side view of bar buckle 39. Bar buckle 39 comprises of two looped links 65 and 66 arranged and tailored to provided the intended function.

FIG. 14 is an elevational frontal view of bar buckle 39. The preferred material of the two looped links 65 and 66 is a weldable material so as to fasten the looped links 65 and 66 together in a particular orientation so as to provide the intended function. Also shown in FIG. 14, is areas 67 and 68 between looped links 65 and 67 illustrating the preferred locations for the weld filler material.

FIG. 15 is a sectional elevational side view of bar buckle 39. Illustrated is the relative location positions of bars 61, 63, 62 and 64 in regards to the looped links 65 and 66 respectively. Bars 61, 63, 62 and 64 are shown rounded but are allowed to be tailored as desired to any shape so as to not limit their function.

FIG. 16 is a top horizontal view of Applicant's hardware arrangement 12 showing lading strap assembly 38, lading strap and tensioning device 52, anchor fitting 50, anchor 25 and side wall post 24 in their respective positions. Looped strap end 73 is attached to tensioning device 40 by way of pin joint 70 to form lading strap and tensioning device 52. In FIG. 16 strap end 54 is routed by way of path 71 through opening 72 in anchor fitting 50 and is routed along path 57 and then onto bar buckle 39. Strap end 55 of lading strap assembly 38 is routed by way of path 56 and into tensioning device 40. FIG. 16 illustrates that all the slack has been removed in lading strap assembly 38 and lading strap and tensioning device 52 and that tension device handle 69 of tensioning device 40 is shown stored in its lowest position.

The receiving end of tensioning device 40 for strap end 55 is illustrated in the elevational side view in FIG. 17.

FIG. 18 is an elevational frontal view of tensioning device 40. The tensioning device handle 69 is shown stored in its lowest position along with its relative position in regards to pin joint 70.

FIG. 19 is a top horizontal view of tensioning device 40. Tensioning device handle 69 is shown swung clockwise as indicated by arrow 74 to its top position ready to operate with a ratcheting type action and take-up any remaining slack in lading strap assembly 38 and lading strap and tension device 52.

FIG. 20 is an elevational back view of anchor fitting 50. FIG. 20 shows back face 76. Slotted opening 72 where the different strap ends such as strap ends 54 and 55 are routed through as previously disclosed is shown.

An elevational side view of anchor fitting 50 is shown in FIG. 21 showing its edge face 83 that is located between back face 76 and front face 77. Retaining end stop 78 is shown extending out of hook portion 82 of said anchor fitting 50.

An elevational frontal view of anchor fitting 50 is shown in FIG. 22 showing its front face 77. A slotted type opening 72 where the different strap ends such as strap ends 54 and 55 are routed through as previously disclosed is shown. A top end view of retainer 80 with end hex socket 84 is shown. Retainer 80 may be a typical industry hex socket head cap screw but equivalents may be used to perform the same purpose. A hex type wrench is inserted into hex socket 84 and wrench turning action is used to screw retainer 80 into the desired position.

FIG. 23 is a sectional top horizontal view taken on line 75 of FIG. 20 showing anchor fitting 50 consists of retainer 80, spring washer 79 and anchor fitting housing 85. Retainer 80 is shown inserted into cavity 81 of anchor fitting housing 85 and seated against spring washer 79 and the bottom of cavity 81 of anchor fitting housing 85.

Sectional top horizontal view FIG. 24 shows anchor fitting 50 in one position relative to wall supports 21 or 31, anchor 25 and side wall stake post 24. In practice it is desired to arrange hardware arrangement 12 so as to result in having back face 76 of anchor fitting 50 as parallel to wall supports 21 or 31. The hooked portion 82 of anchor fitting housing 85 is contoured to seat against the back face 86 of anchor 25 and is illustrated as being flat in FIG. 24.

Sectional top horizontal view FIG. 25 shows that anchor fitting 50 is configured to allow to swing as indicated by arrow 87 until retaining end stop 78 swings and contacts the back face 86 of anchor 25 at contact edge 88. In practice the amount of swing as indicated by arrow 87 is defined by the particular rigging of hardware arrangement 12. Retaining end stop 78 of retainer 80 and hook portion 82 of anchor fitting housing 85 are sized to prevent inadvertent removal of anchor fitting 50 from the opening 89 in anchor 25 when retainer 80 and spring washer 79 are seated in anchor fitting housing 85 as shown in FIGS. 24 and 25.

An alternate form of cargo net 18 with numerous loops 98 is shown in the flat elevational frontal view of cargo net 18 in FIG. 26. Previously disclosed in FIG. 2 a total of twenty loops 15 were arranged along the two vertical flexible wall sections 14 of cargo net 18. FIG. 26 illustrates that cargo net 18 may provide loops 98 along the multiple vertical flexible wall sections 17 as well and is not limited to only the two vertical flexible wall sections 14.

FIG. 27 is partial sectional top horizontal view of cargo net 18 showing an elongated example of loop 98 providing an elongated slot 99 for the routing of strap end 55 of lading strap assembly 38 of hardware arrangement 12 or strap ends 43 and 45 of hardware arrangement 11.

FIG. 28 is a sectional top horizontal view of Hardware arrangement 13 illustrating the Lading Tie Snugger System 10. Hardware arrangement 13 uses numerous lading strap assemblies 91 and 92, capture plates 90 and lading strap and tensioning device assemblies 93 and a cargo net 18.

FIGS. 1 and 2 illustrates the option of five lading strap assemblies 33 and 35, threadable tensioning device 41 and one cargo net 18 for hardware arrangement 11. Hardware arrangement 13 (not shown in FIG. 1) may consist of a similar vertical arrangement of the components such as are shown in FIG. 28. FIG. 28 is a sectional top horizontal view of one such arrangement where the strap pins 53 of lading strap assemblies 91 and 92 is shown properly engaged in anchor 25 and this engagement process is described in U.S. Pat. No. 6,422,794. The lading strap and tensioning device assembly 93 is shown engaged in anchor 25. This engagement process is described in U.S. Pat. No. 6,422,794 with the added installation of capture plate 90 to allow lading strap 94 of lading strap and tensioning device assembly 93 to be routed in the opposite direction from what is taught in U.S. Pat. No. 6,422,794 allowing proper securement of lading 22.

In hardware arrangement 13 components may be installed appropriately within anchors 25 in wall supports 21 and 31 as desired before lading 22 is stowed on support 20 in vehicle 34 and the user does not need access to the anchors 25 after lading 22 is stowed for proper securement.

Before lading 22 is stowed on support 20 in vehicle 34, strap pins 53 of lading strap assemblies 91 and 92 and strap pin 53 of lading strap and tension device assembly 93 may be first installed appropriately within the desired anchors 25 as taught in U.S. Pat. No. 6,422,794. Capture plates 90 are then installed as herein disclosed. Components of hardware arrangement 13 then hang from wall supports 21 and 31 allowing appropriate clearance to allow loading and stowing of lading 22 on support 20 in vehicle 34. Personnel will desire to position lading strap assembly 92 so strap loop 95 is reachable after lading 22 is stowed so lading strap end 96 of lading strap assembly 91 may be routed through cargo net 18 then through strap loop 95 and through tensioning device 19 of lading strap and tensioning device assembly 93 as illustrated in the top horizontal view in FIG. 28. Personnel may position lading strap assembly 92 so strap loop 95 is far enough back from the end of rectangular container 37 to provide an adequate strap angle for proper securement of lading 22.

After lading 22 is stowed as desired, cargo net 18 is placed across lading 22 appropriately and all lading strap ends 96 of lading strap assemblies 91 are routed through loops 15 of cargo net 18 and strap loops 95 of lading strap assemblies 92 as shown in FIG. 28. All lading strap ends 96 of lading strap assemblies 91 are then routed appropriately through tensioning devices 19 of lading strap and tensioning device assemblies 93 so then lading 22 is secured by taking up strap slack by use of tensioning devices 19.

FIG. 29 is a sectional top horizontal view of the strap pin 53 of lading strap assembly 92 shown properly engaged in anchor 25 and side wall stake post 24. The use and engagement process is described in U.S. Pat. No. 6,422,794. Capture plate 90 assures that removal of strap pin 53 is not allowed. Installation of capture plate 90 for orientation of lading strap 97 as shown in FIG. 29 is considered an option and not necessary for proper function of hardware arrangement 13 in securing lading 22 since lading strap 97 of lading strap assembly 92 is oriented as taught by U.S. Pat. No. 6,422,794 and pulls away from capture plate 90.

Figure 30:
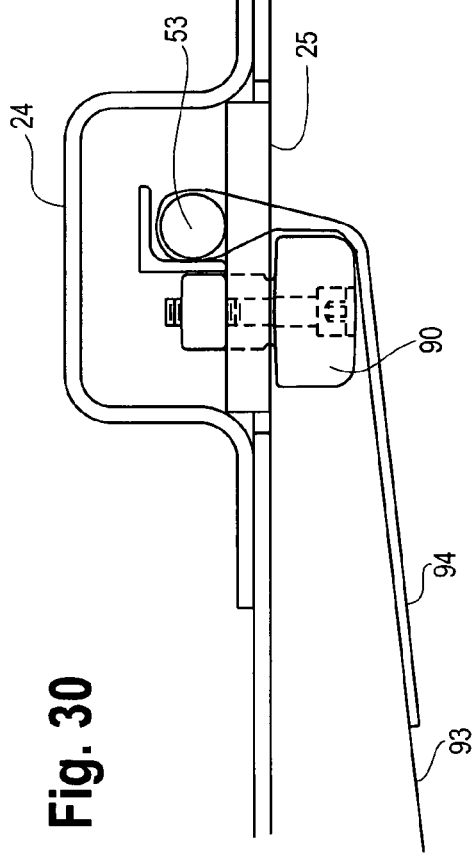
FIG. 30 is a sectional top horizontal view of the strap end properly seated in the anchor and side wall stack post and captivated by applicants capture plate with the strap routed in the opposite direction of what is shown in FIG. 29.

FIG. 30 is a sectional top horizontal view of the strap pin 53 of lading strap and tension device assembly 93 shown properly engaged in anchor 25 and side wall stake post 24. The use and engagement process is described in U.S. Pat. No. 6,422,794. Capture plate 90 is installed to assure that removal of strap pin 53 is not allowed and proper support of lading strap 94 is assured. Installation of capture plate 90 for the orientation of lading strap 94 as shown in FIG. 30 is necessary for proper function of hardware arrangement 13 in securing lading 22 since lading strap 94 of lading strap assembly 93 is not oriented as taught by U.S. Pat. No. 6,422,794 and pulls towards capture plate 90.

Figure 31:
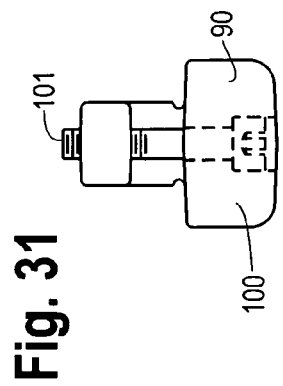
FIG. 31 is a top horizontal view of the capture plate.

FIG. 31 is s top horizontal view of Applicant's capture plate 90. Capture plate 90 is formed to have capture plate housing 100 and capture screw 101. FIG. 31 shows capture screw 101 properly seated in housing 100.

Figure 32:
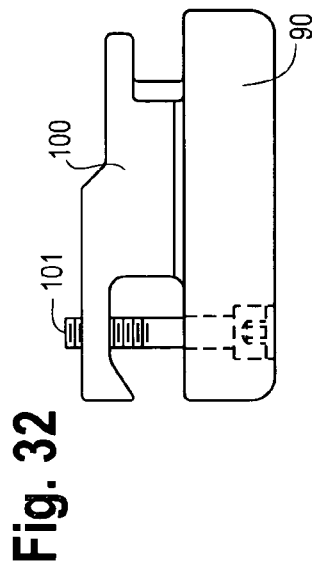
FIG. 32 is an elevational side view of the capture plate.

FIG. 32 is an elevational side view of capture plate 90.

Figure 33:
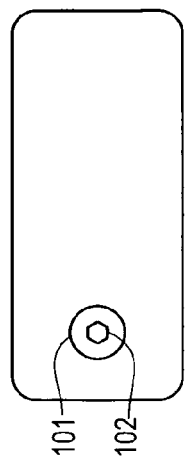
FIG. 33 is an elevational frontal view of the capture plate.

An elevational frontal view of capture plate 90 is illustrated in FIG. 33. A top end view of capture screw 101 with end hex socket 102 is shown. Capture screw 101 may be of the form of a typical industry hex socket head cap screw and is allowed to be tailor to perform its intended purpose. A hex type wrench is inserted into hex socket 102 and wrench turning action is used to screw capture screw 101 into the desired position.

Figure 34:
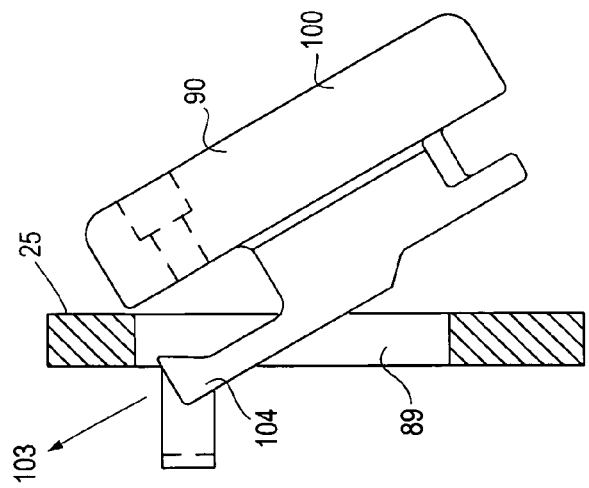
FIG. 34 is a sectional elevational side view of the capture plate housing being inserted into the opening of the anchor.

FIGS. 34 through 37 teaches the installation technique of capture plate 90 into anchor 25. A sectional elevational side view of capture plate housing 100 of capture plate 90 being inserted into the opening 89 in the anchor 25 is shown in FIG. 34. Capture plate 100 is orientated so tab 104 of capture plate housing 100 is allowed to follow a path 103 through the opening 89 in anchor 25.

Figure 35:
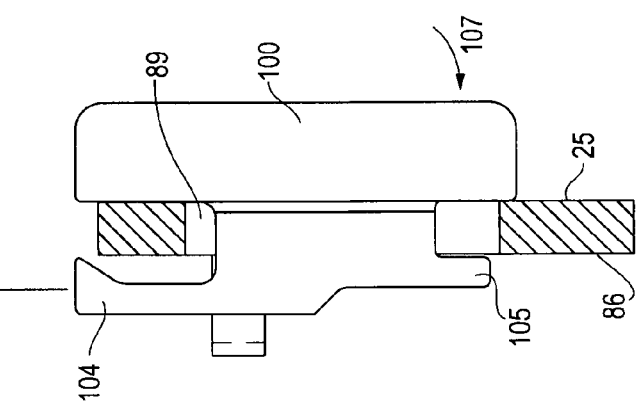
FIG. 35 is a sectional elevational side view of the capture plate housing after being rotated flush up against the flat face of the anchor.

FIG. 35 is a sectional elevational side view of the capture plate housing 100 of capture plate 90 where tab 104 has followed a vertical path 106 along the back face 86 of anchor 25 and tab 105 of capture plate housing 100 had rotated following path 107 until tab 105 is positioned beyond back face 86 of anchor 25.

Figure 36:
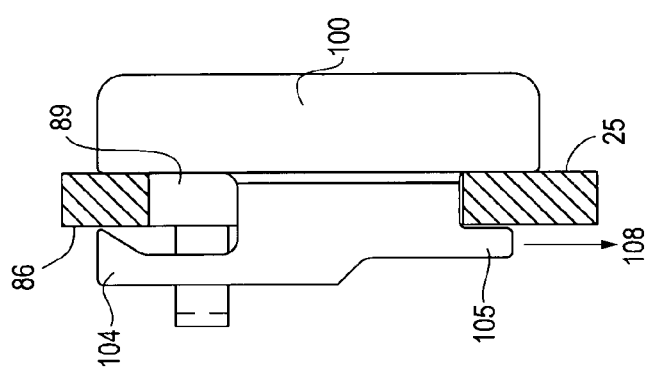
FIG. 36 is a sectional elevational side view of the capture plate housing sliding down along the flat face of the anchor capturing the bottom edge of the anchor.

The sectional elevational side view in FIG. 36 shows the capture plate housing 100 of capture plate 90 where tabs 104 and 105 has followed a vertical path 108 along the back face 86 of anchor 25. Tabs 104 and 105 of capture plate housing 100 are now positioned so as to act as stops preventing the removal of capture plate housing 100 out of the opening 89 of anchor 25.

Figure 37:
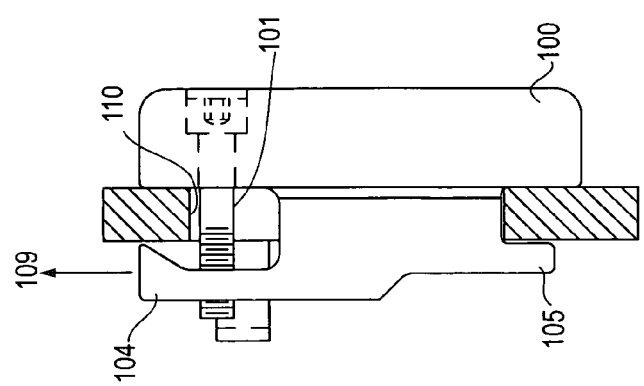
FIG. 37 is a sectional elevational side view of the capture plate housing with the capture screw inserted preventing removal of the capture plate and removal of any previously installed lading strap ends through the opening of the anchor.

FIG. 37 is a sectional elevational side view of the capture screw 101 positioned into capture plate housing 100 forming capture plate 90. Capture screw 101 acts as a vertical stop that would make contact with horizontal surface 110 of anchor 25 if capture plate 90 try's to follow vertical path 109. Inherently capture plate 90 is captivated within opening 89 of anchor 25 by way of tabs 104 and 105 of capture plate housing 100 and capture screw 101.

Removal of capture plate 90 from opening 89 of anchor 25 is accomplished by reversing the technique that is identified in FIGS. 34 through 37. Once capture plate 90 has been removed, strap pin 48 as illustrated in FIG. 7 may be installed or removed as desired and as taught by U.S. Pat. No. 6,422,794.

The lading tie snugger system 10 is different from prior art in that the securement of lading 22 is performed by way of unique and Hardware arrangements 11, 12 and 13 or in combination of any said hardware. Lading tie snugger system 10 provides reusable and Hardware arrangements 11, 12 and 13 so as to provide the user with appropriate and alternative securement techniques of lading 22 in a vehicle 34.

Although the invention is described with respect to a preferred embodiment, modifications thereto will be apparent to those skilled in the art. Therefore, the scope of the invention is to be determined by reference to such claims as may be submitted.

The invention claimed is:

1. A lading tie snugger system for railway cars for securing cargo comprising, in combination:
    lading ties formed of flexible straps with strap end pins that interface with anchor fittings;
    bar buckles interconnecting said straps;
    strap tensioning devices;
    a cargo net for contacting the cargo;
    said lading tie straps and cargo net being held in place by selected, opposed anchor pairs;
    said anchor pairs being contained in a pocket in the wall or floor of a railway box or flat car;
    said tensioning devices being used with one of a first hardware array, a second hardware array or a third hardware array;
    said lading tie snugger system being used is operated to remove slack in the lading ties and apply tension thereon to secure a lading to a railway car where said cargo is positioned inwardly relative to a line between anchor pairs for the first hardware array, positioned crossing a line between anchor pairs for the second hardware array and positioned toward a car end relative to a line between anchor pairs for the third hardware array.

2. The lading tie snugger system of claim 1 further comprising:
    in said second hardware array, straps coact with a buckle and a tensioning device, said second array buckle and tensioning device being located in spaces;
    in said third hardware array of capture plate, lading strap and loop assembly and lading strap and tensioning device are set off in spaces which are defined by cargo and a cargo area.

3. The lading tie snugger system of claim 1 further comprising:
    combining said first hardware array and second hardware array when the mass of cargo lading is large enough to require additional restraining beyond a practical capability by said first hardware array alone.

4. The lading tie snugger system of claim 1 further comprising:
    said first hardware array is combined with said third hardware array on one half of a transporter when the mass of cargo lading is large enough to require additional restraining beyond a practical capability by said first hardware array alone.

* * * * *